United States Patent
Ros et al.

(10) Patent No.: US 9,677,218 B2
(45) Date of Patent: Jun. 13, 2017

(54) METHOD FOR CONTROLLING A MOTOR OF A LAUNDRY DRYER

(71) Applicant: Electrolux Appliances Aktiebolag, Stockholm (SE)

(72) Inventors: Paolo Ros, Fiume Veneto (IT); Agnieszka Kustra, Warsaw (PL)

(73) Assignee: Electrolux Appliances Aktiebolag, Stockholm (SE)

( * ) Notice: Subject to any disclaimer, the term of this patent is extended or adjusted under 35 U.S.C. 154(b) by 0 days.

(21) Appl. No.: 14/782,220

(22) PCT Filed: Apr. 4, 2014

(86) PCT No.: PCT/EP2014/056877
§ 371 (c)(1),
(2) Date: Oct. 2, 2015

(87) PCT Pub. No.: WO2014/166848
PCT Pub. Date: Oct. 16, 2014

(65) Prior Publication Data
US 2016/0040349 A1 Feb. 11, 2016

(30) Foreign Application Priority Data
Apr. 8, 2013 (EP) ..................................... 13162715

(51) Int. Cl.
*D06F 58/28* (2006.01)
*D06F 58/20* (2006.01)

(52) U.S. Cl.
CPC ............ *D06F 58/28* (2013.01); *D06F 58/206* (2013.01); *D06F 2058/289* (2013.01);
(Continued)

(58) Field of Classification Search
CPC .......... F26B 19/00; F26B 21/00; D06F 58/00; D06F 58/12; D06F 58/20; D06F 58/28;
(Continued)

(56) References Cited

U.S. PATENT DOCUMENTS 6,243,969 B1 *   6/2001   Yeazell ................ C11D 3/2068
                                                              34/340
8,387,274 B2 *   3/2013   Ashrafzadeh ........... D06F 58/04
                                                              34/528
(Continued)

FOREIGN PATENT DOCUMENTS

BE          2735643 A1 *  5/2014  ............. D06F 58/28
DE     102007017600 A1   10/2007
(Continued)

OTHER PUBLICATIONS

International Search Report mailed Sep. 9, 2014 in corresponding International Application No. PCT/EP2014/056877.

*Primary Examiner* — Stephen M Gravini
(74) *Attorney, Agent, or Firm* — Banner & Witcoff, Ltd.

(57) ABSTRACT

A method is provided for controlling a motor speed (v) of a motor (16) in a laundry dryer during a drying cycle, which motor (16) is provided for driving a laundry drum (20) and an air stream fan (14) of the laundry dryer. The drying cycle is subdivided into a first part and a second part. During the first part of the drying cycle the motor speed (v) takes a value of a first predetermined motor speed (v1). During the second part of the drying cycle the motor speed (v) takes a value of a second predetermined motor speed (v2). The value of the second predetermined motor speed (v2) is higher than the value of the first predetermined motor speed (v1) and allows laundry tumbling inside the drum (20). The drying cycle changes from the first part to the second part, when laundry (Continued)

dryness (38) of laundry inside the laundry drum (20) has reached a predetermined value.

16 Claims, 4 Drawing Sheets

(52) U.S. Cl.
CPC ............ *D06F 2058/2838* (2013.01); *D06F 2058/2864* (2013.01); *D06F 2058/2877* (2013.01); *D06F 2058/2896* (2013.01); *Y02B 40/72* (2013.01)

(58) Field of Classification Search
CPC ............ D06F 58/206; D06F 58/2864; D06F 58/2877; D06F 58/289; D06F 58/2896; Y02B 40/72
USPC ............ 34/497, 595; 68/19, 20; 8/149, 159
See application file for complete search history.

(56) References Cited

U.S. PATENT DOCUMENTS

| | | | | |
|---|---|---|---|---|
| 8,572,865 B2* | 11/2013 | Beers | ............ | D06F 58/04 237/2 B |
| 8,793,899 B2* | 8/2014 | Kroeger | ............ | D06F 58/10 34/381 |
| 8,919,009 B2* | 12/2014 | Colombo | ............ | D06F 58/28 34/413 |
| 9,097,462 B2* | 8/2015 | Lorenc | ............ | D06F 58/206 |
| 9,356,542 B2* | 5/2016 | Ragogna | ............ | D06F 58/206 |
| 2007/0251118 A1* | 11/2007 | Doh | ............ | D06F 58/28 34/528 |
| 2012/0017457 A1* | 1/2012 | Bae | ............ | D06F 58/203 34/90 |
| 2016/0040349 A1* | 2/2016 | Ros | ............ | D06F 58/28 34/319 |
| 2016/0301349 A1* | 10/2016 | Tezduyar | ............ | D06F 33/02 |

FOREIGN PATENT DOCUMENTS

| | | |
|---|---|---|
| DE | 102011005164 A1 | 9/2012 |
| EP | 1408151 A1 | 4/2004 |
| EP | 2112264 A1 | 10/2009 |
| EP | 2468950 A1 | 6/2012 |
| JP | H07289793 A | 11/1995 |
| KR | 20120079797 A | 7/2012 |
| WO | 2004048673 A2 | 6/2004 |

\* cited by examiner

METHOD FOR CONTROLLING A MOTOR OF A LAUNDRY DRYER

The present invention relates to a method for controlling a motor speed of a motor in a laundry dryer during a drying cycle. Further, the present invention relates to a laundry dryer including a motor for driving a laundry drum and an air stream fan of the laundry dryer and a control unit for controlling a motor speed of the motor during a drying cycle.

BACKGROUND

A usual laundry dryer comprises a substantially parallelepiped-shaped outer box casing and a cylindrical laundry drum for housing the laundry to be dried. The laundry drum is arranged in axially rotating manner inside the casing and rotates about its horizontally oriented longitudinal axis. A front opening for loading and unloading laundry is in the front face of the casing. A door is hinged to the front face of the casing in order to close the front opening.

The laundry dryer of the above type comprises a closed-circuit hot-air generator designed to circulate inside the revolving laundry drum a stream of hot drying air with low moisture content. The drying air stream flows through the revolving laundry drum and over the laundry inside said drum in order to rapidly dry the laundry. The hot-air generator comprises an air recirculating conduit having its two ends connected to opposite sides of the revolving laundry drum. A radial air stream fan is arranged in the recirculating conduit and generates the drying air stream through the revolving drum. A heating device is provided for warming up the drying air stream before said drying air is supplied to the laundry drum. A moisture condensing unit is provided for removing moisture from the drying air stream after said drying air stream has left the laundry drum.

One embodiment of the moisture condensing unit may be formed as an air-to-air type heat exchanger, through which the drying air stream flows. A cooling air stream is conveyed into the laundry dryer, passes through the air-to-air type heat exchanger and is exhausted from the laundry dryer by means of an open cooling air circuit. A cooling air fan is installed within the cooling air circuit. The heating device for warming the drying air before said drying air is supplied to the laundry drum consists in one or more electric heaters.

Another embodiment of the hot-air generator comprises a heat-pump device including a compressing device and two heat exchangers. The compressing device subjects a gaseous refrigerant to compression, e.g. an adiabatic compression, so that the pressure and temperature of the refrigerant are much higher at the outlet than at the inlet of the compressing device. The heat exchangers are arranged one after the other along the drying air stream recirculating conduit and are designed to receive the refrigerant from the compressing device in order to cool down or heat up the airflow, respectively. In detail, a first air-to-refrigerant heat exchanger, commonly referred as the evaporator, is provided for rapidly cooling down the airflow arriving from the revolving laundry drum in order to condense the surplus moisture in the airflow. Further, a second air-to-refrigerant heat exchanger, commonly referred to as the condenser, is provided for rapidly heating up the airflow arriving from the first heat exchanger and directed back to the revolving laundry drum, so that the airflow re-entering into the revolving laundry drum is heated up rapidly to a temperature higher than or equal to that of the air stream flowing out of the revolving laundry drum.

In the above types of domestic laundry dryers, the flow of the drying air stream through the revolving laundry drum is accomplished by an electric motor that drives both the radial air stream fan and a transmission system for rotating the revolving laundry drum. Such motor may be driven by an inverter circuit for controlling motor operating conditions. Usually, software controlling motor operating conditions works independently from actual drying air stream, which can be strongly influenced by the cleanness status of air filters used to catch fluff transported by the drying air stream. The fluff is dust produced by laundry during the drying process. With the continuous accumulation of fluff on the air filters the flow of the drying air stream decreases, while the speed of the air stream fan remains the same for the whole drying process. Thus, the efficiency of the heat pump is affected. Compared to the situation with perfectly clean air filters, the condensing temperature rises more quickly and the maximum heat pump refrigerant fluid temperature threshold is reached rather earlier. Therefore a cooling fan of the compressor device is also activated earlier in order to avoid overheating of the heat pump system. These drawbacks negatively affect the drying performances, because the time cycle is longer and the final energy consumption is higher. At last, average energy consumption measured according to the Standard Energy Label is higher than a drying process carried out with perfectly clean air filters.

EP 2 487 290 A1 discloses a home laundry dryer. The output motor speed is maintained substantially equal to a predetermined speed value, which is associated to a nominal airflow rate within the air recirculating conduit and to a nominal drum speed. Notwithstanding such provisions the energy consumption of a drying process is still undesirably high. In addition, the operating conditions of the laundry dryer are not linked to the actual status of laundry during a drying process.

EP 2 468 950 A1 discloses a process and machine for drying laundry. The motor speed of the laundry drum is controlled in dependence of laundry dryness. The speed of the laundry drum is higher than the lowest speed in order to hold the laundry adhering to a wall of the drum. Therefore such provision is rather useful during a laundry cooling phase than during a drying phase with hot drying air in which it is required that laundry may move through the drum inner chamber so as to intercept the drying air flow.

SUMMARY OF SELECTED INVENTIVE ASPECTS

It is an object of the present invention to provide a method for controlling a motor of a laundry dryer and a corresponding laundry dryer, which overcomes the above problems.

Aspects of the present invention relate to a method for controlling a motor speed of a motor in a laundry dryer during a drying cycle, which motor is provided for driving a laundry drum and/or an air stream fan of the laundry dryer, wherein:
- the drying cycle comprises at least a portion which is subdivided into a first part and a second part,
- during the first part of the drying cycle the motor speed takes a value of a first predetermined motor speed,
- during the second part of the drying cycle the motor speed takes a value of a second predetermined motor speed,
- the value of the second predetermined motor speed is higher than the value of the first predetermined motor speed and allows laundry tumbling inside the drum (20), and the drying cycle changes from the first part to the second part, when a laundry dryness of laundry inside the laundry drum has reached a predetermined value.

The control of the motor speed for the motor driving the laundry drum and/or air stream fan is modified. The motor is rotated at the first predetermined motor speed until the laundry inside the laundry drum reaches a predetermined degree of laundry dryness. When said predetermined degree of laundry dryness has been reached, then the motor speed is increased and preferably kept constant till the end of the drying cycle. The motor speed during the first part of the drying cycle reduces the energy consumption. According to the invention, a drying cycle may comprise one or more portions that may subdivided in a first part during which the motor speed takes the value of said first predetermined motor speed and a second part during which the motor speed takes the value of said second predetermined motor speed.

Preferably, the drying cycle changes from the first part to the second part, when between 50% and 80%, preferably between 60% and 70%, of water initially contained in the laundry to be dried has been removed from the said laundry.

Further, the first predetermined motor speed and the second predetermined motor speed remain always below a minimum speed required for keeping the laundry attached to an inner circumferential wall of the laundry drum. This allows a movement of the laundry inside the laundry drum, so that the drying effect is enhanced.

For example, the drying cycle ends, when the laundry dryness of the laundry inside the laundry drum has reached a predetermined value.

Alternatively, the drying cycle ends, when a predetermined time from the start of the drying cycle has elapsed.

According to another example, the drying cycle ends, when an electrical parameter of a power supply for the motor has reached a predetermined value.

In particular, the method is realized by software controlling the motor speed of the motor in the laundry dryer.

Aspects of the present invention relate to a laundry dryer including a motor for driving a laundry drum and/or an air stream fan of the laundry dryer and a control unit for controlling a motor speed of the motor during a drying cycle, wherein:
the drying cycle comprises at least a portion which is subdivided into a first part and a second part,
during the first part of the drying cycle the motor speed takes a value of a first predetermined motor speed,
during the second part of the drying cycle the motor speed takes a value of a second predetermined motor speed,
the value of the second predetermined motor speed is higher than the value of the first predetermined motor speed and allows laundry tumbling inside the drum (20), and
the drying cycle changes from the first part to the second part, when a laundry dryness of laundry inside the laundry drum has reached a predetermined value.

The motor speed for the laundry drum and/or air stream fan is modified. The motor rotates at the first predetermined motor speed until the laundry inside the laundry drum reaches a predetermined degree of laundry dryness. When said predetermined degree of laundry dryness has been reached, then the motor speed is increased and preferably kept constant till the end of the drying cycle. The motor speed during the first part of the drying cycle reduces the energy consumption. According to the invention, a drying cycle may comprise one or more portions that may subdivided in a first part during which the motor speed takes the value of said first predetermined motor speed and a second part during which the motor speed takes the value of said second predetermined motor speed.

Preferably, the control unit comprises or corresponds with an inverter circuit for driving the motor.

In particular, the laundry dryer includes at least one detection device for sensing the laundry dryness of the laundry inside the laundry drum. The detection device may comprise at least one pair of electrodes arranged inside the laundry drum.

For example, the laundry dryer comprises a heat pump system.

Alternatively, the laundry dryer comprises a moisture condensing unit formed as an air-to-air heat exchanger. In this case, the laundry dryer may comprise a cooling air fan for driving cooling air in an open cooling air channel.

Moreover, the air stream fan may be provided for driving a drying air stream within a closed air stream channel.

At last, aspects of the present invention relate to a computer program product stored on a computer usable medium, comprising computer readable program means for causing a computer to perform the method for controlling the motor speed of the motor in the laundry dryer during the drying cycle.

Novel and inventive features believed to be the characteristic of the present invention are set forth in the appended claims.

BRIEF DESCRIPTION OF THE DRAWINGS

The invention will be described in further detail with reference to the drawings, in which.

DETAILED DESCRIPTION OF EXAMPLE EMBODIMENTS

Figure 1:
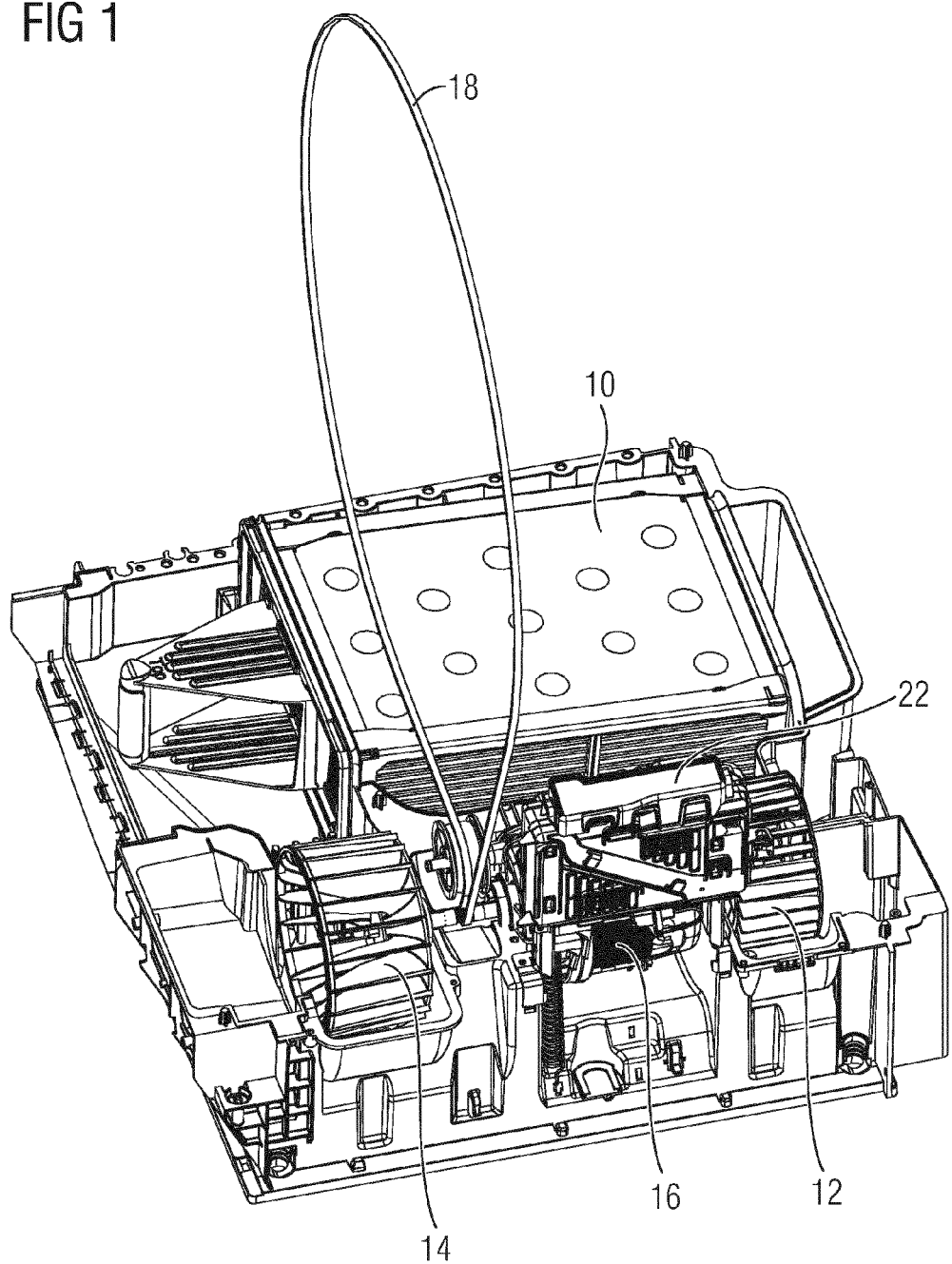
FIG. 1 illustrates a perspective view of a basement portion for a laundry dryer according to a first embodiment of the present invention.

FIG. 1 illustrates a perspective view of a basement portion for a laundry dryer according to a first embodiment of the present invention. In the laundry dryer of the first embodiment the moisture condensing unit is formed as an air-to-air heat exchanger 10.

The air-to-air heat exchanger 10 forms a substantial part of the basement portion. Further, the basement portion includes an air stream fan 14 and a cooling air fan 12. The air stream fan 14 and the cooling air fan 12 are both radial fans. The air stream fan 14 is arranged within a closed air stream channel and provided for driving a drying air stream. The cooling air fan 12 is arranged within an open air stream circuit and provided for driving a cooling air stream. The drying air stream and the cooling air stream interact inside the air-to-air heat exchanger 10.

A motor 16 is provided for driving the air stream fan 14 and the cooling air fan 12. Further, the motor 16 is provided for driving a laundry drum 20 via a driving belt 18. The laundry drum 20 is not shown in FIG. 1. The motor 16 is driven by an inverter circuit 22 arranged above said motor 16. Said inverter circuit controls the operation of the motor 16. A heating device, which is not shown in FIG. 1, is provided for warming up the drying air stream before the drying air is supplied to the laundry drum 20. The heating device includes one or more heating elements.

The air-to-air heat exchanger 10 works as a moisture condensing unit. A cooling air stream is conveyed through the open air stream circuit and the air-to-air heat exchanger 10 by the cooling air fan 12. The cooling air stream cools down the drying air stream in the air-to-air heat exchanger 10, so that the moisture of the drying air stream condenses in the air-to-air heat exchanger 10. Then, the heating device warms up the drying air stream. At last the drying air stream is supplied to the laundry drum 20 again.

Figure 2:
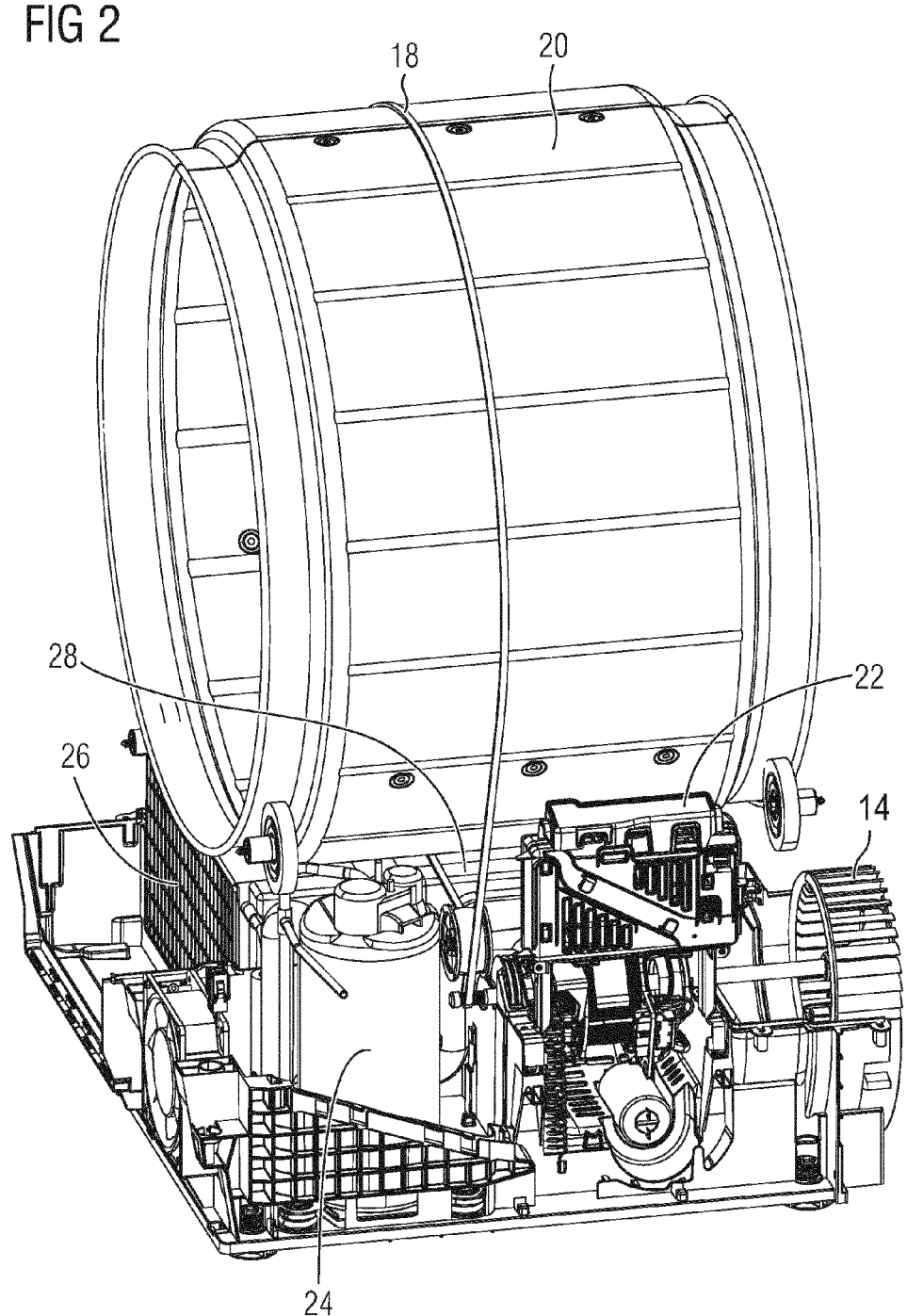
FIG. 2 illustrates a perspective view of the basement portion for the laundry dryer according to a second embodiment of the present invention.

FIG. 2 illustrates a perspective view of the basement portion for the laundry dryer according to a second embodiment of the present invention. In the laundry dryer of the second embodiment the moisture condensing unit is formed as a heat pump system. The laundry drum 20 is arranged above the basement portion. The motor 16 and the inverter circuit 22 are of the same type as in the first embodiment.

The heat pump system includes a compressing device 24, a first air-to-refrigerant heat exchanger 26 and a second air-to-refrigerant heat exchanger 28 forming a refrigerant circuit. The compressing device 24 compresses a gaseous refrigerant, so that the pressure and temperature of the refrigerant are much higher at the outlet than at the inlet of the compressing device 24. For example, the compression is an adiabatic compression. The first air-to-refrigerant heat exchanger 26, commonly referred as evaporator, cools down the drying air stream arriving from the revolving laundry drum 20 in order to condense the surplus moisture in said drying air stream. At the same time, the first air-to-refrigerant heat exchanger 26 heats up the refrigerant. The second air-to-refrigerant heat exchanger 28, commonly referred as condenser, heats up again the drying air stream arriving from the first air-to-refrigerant heat exchanger 26. At the same time, the second air-to-refrigerant heat exchanger 28 cools down the refrigerant. The drying air stream is then directed back to the revolving laundry drum 20. The temperature of the drying air stream re-entering into the laundry drum 20 is higher than or equal to that of the drying air stream flowing out of the laundry drum 20.

Figure 3:
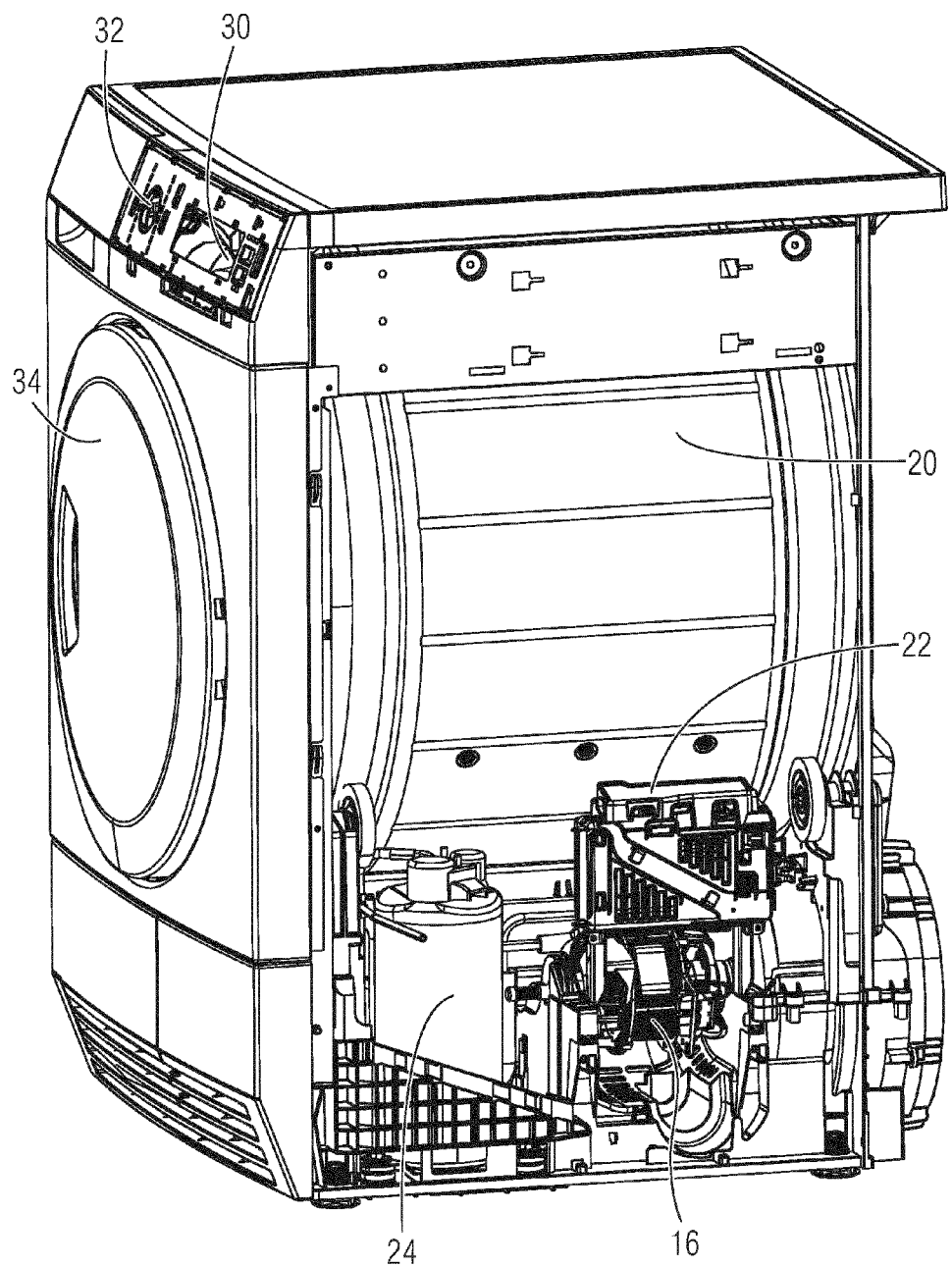
FIG. 3 illustrates a perspective view of the laundry dryer with an open side wall according to the second embodiment of the present invention.

FIG. 3 illustrates a perspective view of the laundry dryer with an open side wall according to the second embodiment of the present invention. FIG. 3 shows the complete laundry dryer except the right side wall of the casing. The laundry dryer comprises a control unit 30 and a user interface 32 arranged above a front door 34. The front door 34 is provided for opening and closing an aperture of the laundry drum 20.

Figure 4:
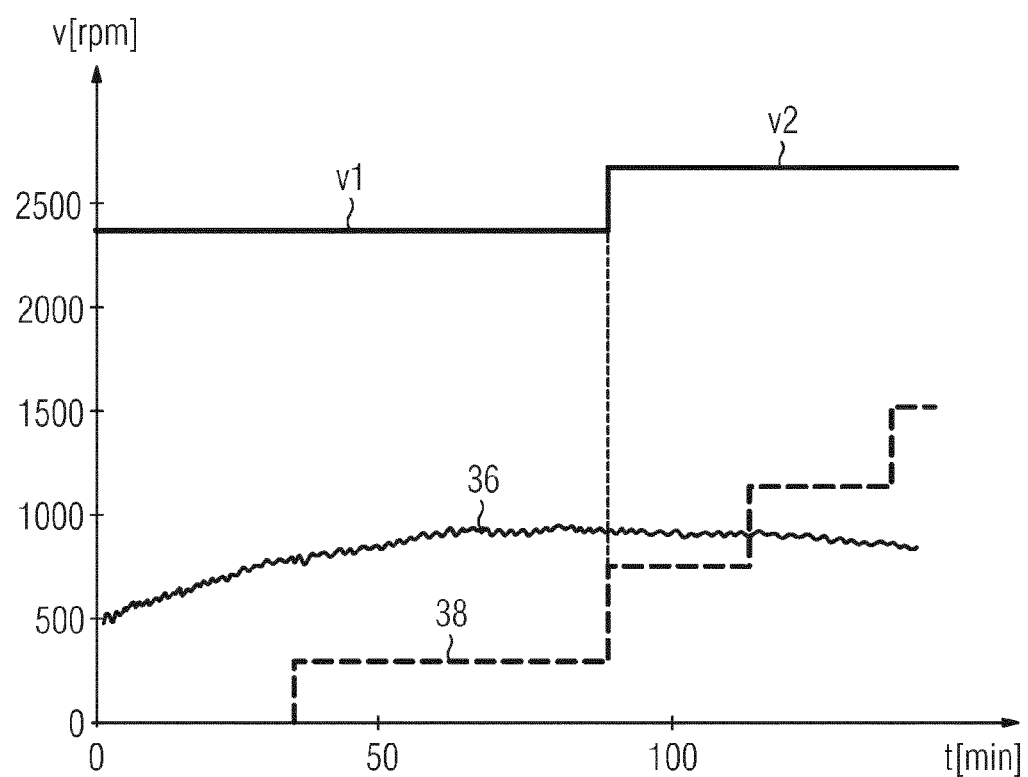
FIG. 4 illustrates a schematic diagram of a motor speed as function of time during a drying cycle according to the present invention.

FIG. 4 illustrates a schematic diagram of a motor speed v as function of time t during a drying cycle according to the present invention. A diagram 36 of the dryer overall power consumption and a diagram 38 of the laundry dryness are also shown in FIG. 4.

The drying cycle comprises at least a portion which is subdivided in a first part and a second part. The period of the second part is shorter than the period of the first part. During the first part of the drying cycle the motor speed v takes a value of a first predetermined motor speed v1. Then, the motor speed v takes a value of a second predetermined motor speed v2 during the second part of the drying cycle. The value of the second predetermined motor speed v2 is higher than the value of the first predetermined motor speed v1 and allows laundry tumbling inside the drum 20.

The present invention consists in a modification of the software controlling the motor speed v of the motor driving the laundry drum 20 and/or the air stream fan 14 and/or the cooling air fan 12 during the drying cycle. According to the present invention, during the drying cycle, the motor 16 is rotated at the first predetermined motor speed v1 until the laundry inside the laundry drum 20 reaches a predetermined degree of laundry dryness 38. When said predetermined degree of laundry dryness 38 has been reached, the motor speed v is increased and preferably kept constant till the end of the drying cycle. The laundry dryness 38 is detected by a usual sensing device such as a pair of electrodes arranged within the drum. The end of the drying cycle may be determined in different ways. For example, the drying cycle ends, when the laundry dryness 38 reaches a predetermined value or a predetermined time from the start of the drying cycle has elapsed. Further, the drying cycle may end, when an electrical parameter of the motor supply, e.g. current, voltage or power, reaches a predetermined value.

The lower first predetermined motor speed v1 in the first part of the drying cycle generates a slower flow of the drying air stream through the moisture condensing unit 10 or 26, respectively, so that the condensation is improved. Additionally, the lower first predetermined motor speed v1 effects a slower rotation of the laundry drum 20, so that frictional losses are reduced. Further, the slower rotation of the laundry drum 20 reduces the losses of drying air through seals interconnecting the rotating laundry drum 20 with the appliance cabinet.

In this example, the first predetermined motor speed v1 is about 2400 rpm, and the second predetermined motor speed v2 is about 2700 rpm. Thereby, the first predetermined motor speed v1 corresponds with a drum rotation speed of 48 rpm, and the second predetermined motor speed v2 corresponds with a drum rotation speed of 54 rpm. Such speeds v1 and v2 ensure that laundry inside the drum can tumble. Preferably, the change of motor speed v from the first predetermined motor speed v1 to the second predetermined motor speed v2 happens, when between about 60% and 70% of water initially contained in the laundry to be dried has been removed from said laundry.

The first part of the drying cycle may be anticipated by a further cycle portion wherein the motor speed v is different from v1 and v2, and such speed is defined for appropriately initiating the drying cycle. For example, motor speed v may be lower than v1 so as to agitate and uniformly distribute laundry inside the drum. Similarly, the second part of the drying cycle may be followed by another cycle portion wherein the motor speed v' is different from v1 and v2, and such speed is defined for appropriately terminating the drying cycle. For example, motor speed v' may be greater than v2 so as to attach the laundry mass to the inner surface of the drum for cooling such mass.

In comparable laundry dryers of the prior art the motor speed is kept at a value of about 2700 rpm constant substantially for the whole drying cycle. The present invention saves energy by lowering the motor speed v during the first part of the drying cycle, wherein the motor speed v is 2400 rpm instead of about 2700 rpm. In the second part of the drying cycle according to the present invention, the motor speed v has about the same value of 2700 rpm as the comparable laundry dryers of the prior art. The motor speed v of 2300 rpm during the first part of the drying cycle reduces the energy consumption.

The motor speed v is controlled by the inverter circuit 22 of the laundry dryer. During the drying cycle, the motor speed v remains always below the minimum speed, which is required for keeping laundry attached to the inner wall of the laundry drum 20. This allows a movement of the laundry inside the laundry drum 20, so that the drying effect is enhanced.

The present invention may be applied to laundry dryer having a heat pump system as well as a moisture condensing unit realized by the air-to-air heat exchanger. In the latter case, when the moisture condensing unit is realized by the air-to-air heat exchanger, then the motor 16 controlled by the inverter unit 22 drives the laundry drum 20 and/or the air stream fan 14, while the cooling air fan 12 may be driven by another motor and controlled independently from the motor 16 for the laundry drum 20 and the air stream fan 14.

For each drying program selectable by a user, specific motor speeds v may be provided. Also the laundry dryness 38 determining the change from the first motor speed v1 to the second motor speed v2 may be specifically determined for each drying program selectable by the user.

Furthermore, according to the invention a drying cycle may comprise one or more portions that may subdivided in a first part during which the motor speed takes the value of said first predetermined motor speed and a second part during which the motor speed takes the value of said second predetermined motor speed.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope of the invention as claimed. All such changes and modifications are intended to be included within the scope of the invention as defined by the appended claims.

LIST OF REFERENCE NUMERALS 10 air-to-air heat exchanger
12 cooling air fan
14 air stream fan
16 motor
18 driving belt
20 laundry drum
22 inverter circuit
24 compressing device
26 first air-to-refrigerant heat exchanger
28 second air-to-refrigerant heat exchanger
30 control unit
32 user interface
34 front door
36 dryer power consumption
38 laundry dryness
v motor speed
v1 first predetermined motor speed
v2 second predetermined motor speed
t time

The invention claimed is:

1. A method for controlling a motor speed (v) of a motor in a laundry dryer during a drying cycle, which motor is provided for driving a laundry drum and an air stream fan of the laundry dryer, wherein:
the drying cycle comprises at least a portion which is subdivided into a first part and a second part,
during the first part of the drying cycle the motor speed (v) takes a value of a first predetermined motor speed (v1) corresponding to a first drum rotation speed,
during the second part of the drying cycle the motor speed (v) takes a value of a second predetermined motor speed (v2) corresponding to a second drum rotation speed,
the value of the second predetermined motor speed (v2) is higher than the value of the first predetermined motor speed (v1) and allows laundry tumbling inside the drum, and
the drying cycle changes from the first part to the second part, when a laundry dryness of laundry inside the laundry drum has reached a predetermined degree of dryness.

2. The method according to claim 1,
wherein the drying cycle changes from the first part to the second part, when between 50% and 80%, of water initially contained in the laundry to be dried has been removed from the said laundry.

3. The method according to claim 1,
wherein the first predetermined motor speed (v1) and the second predetermined motor speed (v2) remain always below a minimum speed required for keeping the laundry attached to an inner circumferential wall of the laundry drum.

4. The method according to claim 1,
wherein the drying cycle ends, when the laundry dryness of the laundry inside the laundry drum has reached a predetermined degree of dryness.

5. The method according to claim 1,
wherein the drying cycle ends, when a predetermined time (t) from the start of the drying cycle has elapsed.

6. The method according to claim 1,
wherein the drying cycle ends, when an electrical parameter of a power supply for the motor has reached a predetermined value.

7. The method according to claim 1,
wherein the method is realized by software controlling the motor speed (v) of the motor in the laundry dryer.

8. A laundry dryer including a motor for driving a laundry drum and an air stream fan of the laundry dryer and a control unit for controlling a motor speed (v) of the motor during a drying cycle, wherein:
the drying cycle comprises at least a portion which is subdivided into a first part and a second part,
during the first part of the drying cycle the motor speed (v) takes a value of a first predetermined motor speed (v1) corresponding to a first drum rotation speed,
during the second part of the drying cycle the motor speed (v) takes a value of a second predetermined motor speed (v2) corresponding to a second drum rotation speed,
the value of the second predetermined motor speed (v2) is higher than the value of the first predetermined motor speed (v1) and allows laundry tumbling inside the drum, and
the drying cycle changes from the first part to the second part, when a laundry dryness of laundry inside the laundry drum has reached a predetermined degree of dryness.

9. The laundry dryer according to claim 8,
wherein the control unit comprises or corresponds with an inverter circuit for driving the motor.

10. The laundry dryer according to claim 8,
wherein the laundry dryer includes at least one detection device for sensing the laundry dryness of the laundry inside the laundry drum.

11. The laundry dryer according to claim 10,
wherein the detection device comprise at least one pair of electrodes arranged inside the laundry drum.

12. The laundry dryer according to claim 8,
wherein the laundry dryer comprises a heat pump system.

13. The laundry dryer according to claim 8,
wherein the laundry dryer comprises a moisture condensing unit formed as an air-to-air heat exchanger (10), wherein the laundry dryer comprises a cooling air fan for driving cooling air in an open cooling air channel.

14. The laundry dryer according to claim 8,
wherein the air stream fan is provided for driving a drying air stream within a closed air stream channel.

15. A computer program product stored on a computer usable medium, comprising computer readable program means for causing a computer to perform a method according to claim 1.

16. The method according to claim 1, wherein the drying cycle changes from the first part to the second part, when between 60% and 70% of water initially contained in the laundry to be dried has been removed from the said laundry.

* * * * *